May 16, 1961  W. STRAUSS  2,984,698
INSULATING GROMMET
Filed Feb. 4, 1959

INVENTOR
William Strauss

BY Ralph B. Stewart
ATTORNEY

United States Patent Office 2,984,698
Patented May 16, 1961

2,984,698

INSULATING GROMMET

William Strauss, Huntingdon Valley, Pa.
(4716 N. 2nd St., Philadelphia 20, Pa.)

Filed Feb. 4, 1959, Ser. No. 791,085

6 Claims. (Cl. 174—138)

This invention relates to an electrically insulating grommet usable for mounting electric terminals or other conducting parts upon a metal panel or other chassis part.

The grommet to which the invention relates is of the type which is formed of a molded plastic body having a head portion provided with a central opening, and a reduced shank section extending away from the head portion along the axis of the central opening, the shank being divided longitudinally by spaced slots to form circumferentially spaced segments, the central opening in the head portion being extended through the shank section, but at a reduced diameter, so that a shank expanding element, such as a self-threading screw, may be introduced through the central opening of the head and expand the shank segments radially to effect locking of the grommet within an opening in a supporting panel or other supporting structure.

In grommets used heretofore, the slots or grooves between adjacent shank segments form open channels exposing parts of the expanding element, and these channels provide pockets into which conducting particles may accumulate in contact with the expanding element and form a leakage path between the expanding element and the supporting panel, thereby destroying or effectively reducing the insulating character of the grommet mounting.

The instant invention provides a snap-in type of grommet which more adequately insures continued electrical insulation without adversely effecting the other desirable features of this grommet type connector-insulator. Further, this is accomplished according to the invention without undesirably increasing the cost or difficulty of manufacture of the grommet. A grommet constructed according to this invention will be competitive in price with the prior known grommets of a similar type yet will possess the additionally desired characteristics set forth herein.

A broad object of this invention is to provide a grommet which will securely attach plates, sheets, etc. to each other and which provides better electrical insulating properties between the interconnected elements than heretofore.

Still another object of the invention is to provide a grommet utilizing a self-threading screw for expanding the shank, or a similar shank-expanding element, wherein means are provided to prevent the accumulation of unwanted electrically conductive particles in contact with the expanding element and with the adjacent plate or supporting structure which would cause electrical shorts or at least a leakage of current.

The grommet of my invention is provided with an insulating cylindrical core portion joining the inner edges of the shank segments, and forming an insulating sleeve in which the expanding screw is mounted.

A preferred form of the invention is shown in the accompanying drawing in which.

Figure 1:
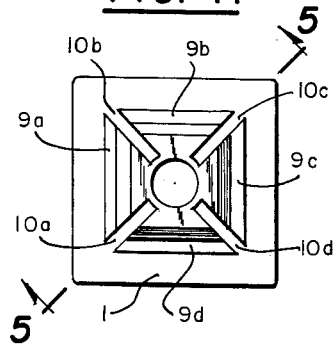
Figure 1 is an end elevational view of a connector constructed in accordance with the invention.

Referring to the drawing, the grommet comprises a body of molded plastic material having a head portion 1 which may have any desired form or shape other than the square form shown in the drawing. Preferably the head portion 1 is flat, that is, it has a flat top face 2a and a flat opposite face or shoulder 2b. The head portion has a central bore 3 formed therein, and the remainder of the head portion may be solid, but, for the purpose of conserving material, the head may have a number of cavities 6a, 6b, 6c and 6d formed therein and opening through the top face, leaving a cylindrical wall 4 surrounding the bore 3 and providing radially extending partition walls 5a, 5b, 5c and 5d located between the cavities.

Figure 2:
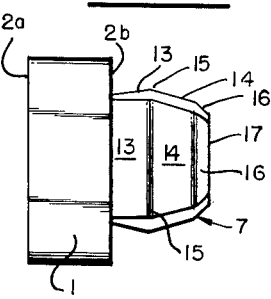
Figure 2 is a side elevational view thereof.
Figure 3:
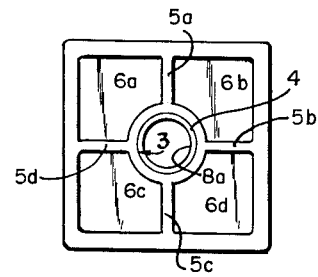
Figure 3 is an elevational view of the end opposite that illustrated in Figure 1.
Figure 4:
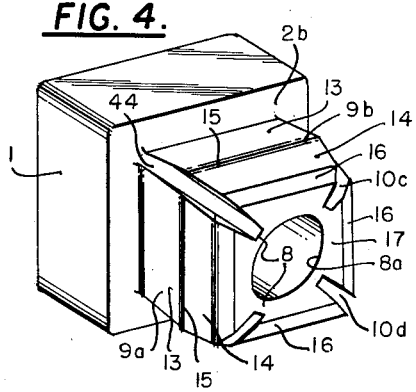
Figure 4 is a perspective view.
Figure 5:
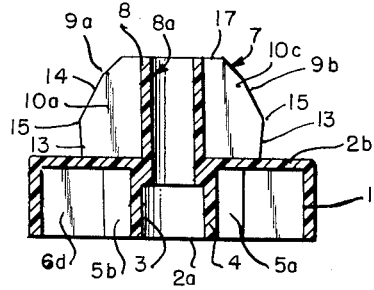
Figure 5 is a sectional view taken along line 5—5 of Figure 1.

The grommet body also includes a shank section formed integrally with the head section and extending away from the head along the axis of bore 3. The shank is indicated generally at 7 in Figure 2 and is shown to the right of the head shoulder 2b. The shank is of reduced section with respect to the head, and its section is of polygon outline to conform with the shape of the mounting hole. While a square section is shown and described herein, other polygon shapes may be used.

The shank has a central core portion in the form of a thin-walled cylindrical sleeve 8 formed integrally with the head and extending outwardly from the head shoulder 2b concentric with the axis of the central opening 3. The sleeve 8 has a cylindrical bore or opening 8a which constitutes a continuation of the central opening 3 in the head but at a reduced diameter. The bore 8a is of a smaller diameter than the expanding screw which is to be received in this bore. The outer portion of the shank section is divided longitudinally into two or more parallel segments. In the example shown there are four 9a, 9b, 9c and 9d formed integrally with the head and extending in parallel relation outwardly from the shoulder 2b and being equally spaced about the common axis of bores 3 and 8a. The inner edges of the segments are formed integrally with the core portion 8, so that adjacent segments are joined together by relatively short circumferential sections of the cylinder sleeve portion. The circumferential spacing of shank segments 9a, 9b, 9c and 9d provides slot formations 10a, 10b, 10c and 10d between adjacent pairs of segments, the bottom of each slot being formed by the outer surface of the core sleeve 8. The slots allow radial expansion and contraction of the shank segments, and the joining wall portions of sleeve 8 are sufficiently thin to permit such expansion and contraction without disruption of the protective sleeve surrounding the mounting screw which has threaded engagement with the inner surface of the bore 8a. While the slots 10a, 10b, 10c and 10d are shown as being formed along lines joining diagonal corners of the square shank section, they may be formed along lines which are at right angles to the sides of the square section, and in this case only two slots may be formed on opposite sides of the grommet axis to divide the shank into only two segments. It is clear also that the outer portion of the shank may be divided into more than four segments if desired.

Each of the shank segments presents a flat outer surface 13 adjacent the head 1, which surface is inclined outwardly with respect to the central axis of the shank. The surfaces 13 are each joined to a substantially flat surface 14 which is inclined inwardly with respect to the said axis and which form apices 15 at the points of joining the surfaces 13 about mid-way of the ends of the shank section. Each of the shank segments may also have a third substantially flat surface 16 which is inclined inwardly with respect to its surface 14. The shank segments terminate at their ends in a common flat inner face 17.

The insulator is formed of a plastic material which is used for similar items known in the electrical art. This material is sufficiently flexible to permit compression of the shank segments, or the segments can be expanded by forcing into the bore an arbor-like expanding member of a larger size than the bore. Also the plastic is capable of being cut into by the threads of a metal screw.

Figure 6:
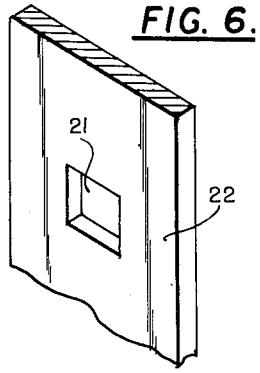
Figure 6 is a fragmentary perspective view of a plate having an opening adapted to cooperate with the connector of Figures 1–5.
Figure 7:
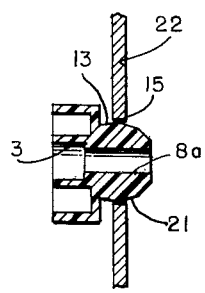
Figure 7 is a sectional elevational view showing the first step in the insertion of the connector into a plate.
Figure 8:
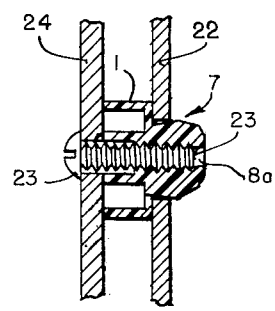
Figure 8 is a sectional elevational view showing the connector and terminal support in its final position with respect to the plate and also illustrating a fastening means utilized in expanding the support to lock it into position and to interconnect two plates.

In using the grommet, the shank is inserted into a mounting opening such as opening 21 in a panel 22 or other support member, see Fig. 6. The opening is formed of a shape complementary to the sectional shape of the shank but with a width smaller than the distance laterally across the shank between opposite pairs of apices 15. As illustrated in Figure 7, the flexible plastic grommet must be forced through the opening 21. The wall sections of the core 8 which bridge gaps 10a, 10b, 10c and 10d are compressed as the shank sections are forced inwardly as the apices 15 are forced into the opening 21. Once the apices 15 pass through the opening in the wall of the chassis the shank will expand, as in Figure 8. The outer surfaces 13 of the shank segments will engage the walls of opening 21 and will frictionally maintain the grommet in position. To effect a more secure locking of the grommet in position, especially where the shank does not completely fill the opening 21, a screw 23 is driven into the central bore of the grommet. The screw will form threads in the wall of the core portion 8 at the same time that it is being driven into the grommet. The screw is small enough to enter bore 3 freely but it has a diameter sufficiently larger than the diameter of the bore 8a to expand the shank segments as the threads are cut into the core portion 8. This is illustrated in Figure 8 where it is seen that the screw has expanded the shank segments to tightly grip the walls of opening 21. As also illustrated in Figure 8 the screw 23 is used to attach a second plate or other element 24 to the plate 22. Element 24 can be an electrical component or the side of a chassis sub-assembly. The screw thus expands the shank segments and locks the grommet more firmly in plate 22 at the same time that plate 24 is mechanically connected in supporting relationship to plate 22.

As is apparent from an examination of Figures 1, 4, 5 and 8 the core portion 8 surrounds the metallic expanding element and provides an insulating covering for that element in the form of a complete cylindrical enclosure wall, the core portion 8 being thin enough to insure proper flexibility of the shank segments with respect to each other. It will be understood that the slots 10a, 10b, etc., between adjacent shank segments provide space for the inward movement of the segments without involving any appreciable distortion of the shape of the individual segments.

The core portion 8 protects the expanding element (screw 23) from contact with pieces of solder, metal filings, or bits of metal cut from the chassis which might fall into the slots between the shank segments after the grommet is in place. This insures proper insulation in the connection and prevents actual shorts between the two plates 22 and 24.

The shape of the shank section and the opening 21 are such that relative rotation between the grommet and the plate is impossible. Thus when the shank is inserted in the opening, the grommet will be held against rotation while the screw is being made-up.

I claim:
1. An electrically insulating grommet comprising a body of molded plastic material having a head portion with a central opening therein, a shank section formed of at least a pair of shank segments extending outwardly from one side of the head in spaced relationship to each other on opposite sides of the axis of said opening, a central core portion for said shank section comprising a cylindrical sleeve extending outwardly of said head between said shank segments, said sleeve being formed integrally with said shank segments to form a complete cylindrical enclosure wall joining said shank segments and extending outwardly from said head, the inner wall of said sleeve presenting a complete cylindrical surface to provide a complete cylindrical cover for an expanding element when inserted in said sleeve, the portions of said sleeve joining said shank segments having a thickness radially of the bore of said sleeve which is small with respect to the radial thickness of said shank segments and being sufficiently thin and flexible to permit relative expansion and contraction of said shank segments with respect to each other without rupturing said sleeve portions.

2. A grommet according to claim 1 wherein said core extends throughout the length of said segments.

3. A grommet according to claim 1 wherein said shank segments are spaced from each other by slots having bottom walls formed of said core portion.

4. A grommet according to claim 1 wherein the central opening in said head portion is of greater diameter than the internal diameter of said cylindrical sleeve of said core portion.

5. In a grommet mounting of the type comprising a body of molded plastic material having a head portion and a reduced shank section formed integrally therewith, a central opening extending axially through the head and shank section, said shank section being divided longitudinally to form parallel shank segments spaced from each other about the axis of said opening, and a metallic expanding element being located in said opening to expand the segments of said shank section, the improvement which comprises wall portions formed integrally with said shank segments and bridging the gaps between adjacent shank segments immediately adjacent said metallic expanding element and presenting a complete cylindrical surface for direct contact with said expanding element, said wall portions having a thickness radially of said opening which is small with respect to the radial thickness of said segments and being sufficiently flexible to permit relative expansion and contraction of said shank segments with respect to each other without rupturing said sleeve portions, and said wall portions extending throughout the length of said shank section.

6. A grommet mounting according to claim 5 wherein said expanding element comprises a screw having threaded engagement with each of said bridging wall portions.

References Cited in the file of this patent
UNITED STATES PATENTS

| | | |
|---|---|---|
| 2,225,472 | Franklin | Dec. 17, 1940 |
| 2,545,514 | Erb | Mar. 20, 1951 |
| 2,573,498 | Scott | Oct. 30, 1951 |
| 2,836,214 | Rapata | May 27, 1958 |
| 2,921,819 | Rifkin | Jan. 19, 1960 |